(12) United States Patent
Fritze

(10) Patent No.: US 6,632,355 B2
(45) Date of Patent: Oct. 14, 2003

(54) LOW SPILLAGE REPLACEABLE WATER FILTER ASSEMBLY

(75) Inventor: Karl Fritze, Denmark Township, MN (US)

(73) Assignee: PentaPure Incorporated, Eagan, MN (US)

( * ) Notice: Subject to any disclaimer, the term of this patent is extended or adjusted under 35 U.S.C. 154(b) by 0 days.

(21) Appl. No.: 09/918,316

(22) Filed: Jul. 30, 2001

(65) Prior Publication Data

US 2003/0019805 A1 Jan. 30, 2003

(51) Int. Cl.$^7$ .................... B01D 27/08; B01D 27/10; B01D 35/30; B01D 35/14; B01D 35/34
(52) U.S. Cl. .............. 210/232; 210/248; 210/249; 210/443; 210/444; 210/450
(58) Field of Search .................. 210/232, 238, 210/249, 443, 444, 450, 248

(56) References Cited

U.S. PATENT DOCUMENTS

| | | |
|---|---|---|
| 2,208,754 A | 7/1940 | Eggert et al. |
| 2,858,026 A | 10/1958 | Lorimer |
| 3,002,870 A | * 10/1961 | Belgarde et al. |
| 3,727,764 A | 4/1973 | Ogden |
| 3,746,171 A | 7/1973 | Thomsen ............... 210/234 |
| 4,515,692 A | 5/1985 | Chandler et al. ........ 210/278 |
| D290,386 S | 6/1987 | Padilla ................... D23/3 |
| D291,479 S | 8/1987 | Padilla et al. ............ D23/43 |
| 4,725,323 A | 2/1988 | Ostreicher et al. ........ 156/69 |
| 4,731,184 A | 3/1988 | Ostreicher et al. ........ 210/450 |
| 4,735,716 A | 4/1988 | Petrucci et al. .......... 210/232 |
| D296,463 S | 6/1988 | Padilla ................. D23/209 |
| 4,769,052 A | 9/1988 | Kowalski ................ 55/379 |
| 4,806,240 A | 2/1989 | Giordano et al. ......... 210/232 |
| 4,865,738 A | 9/1989 | Black, Jr. et al. ......... 210/484 |
| 4,877,521 A | 10/1989 | Petrucci et al. .......... 210/171 |
| D306,754 S | 3/1990 | Petrucci et al. .......... D23/209 |
| D306,755 S | 3/1990 | Petrucci et al. .......... D23/209 |
| 4,915,831 A | 4/1990 | Taylor ................... 210/232 |
| 4,923,601 A | 5/1990 | Drori ................... 210/107 |
| 4,942,630 A | 7/1990 | Kantor et al. |
| 4,948,505 A | 8/1990 | Petrucci et al. .......... 210/238 |
| D313,832 S | 1/1991 | Petrucci et al. .......... D23/209 |
| D314,809 S | 2/1991 | Petrucci et al. .......... D23/209 |
| D315,013 S | 2/1991 | Petrucci et al. .......... D23/209 |
| D307,040 S | 5/1991 | Petrucci et al. .......... D23/209 |
| 5,013,434 A | 5/1991 | Furrow ................. 210/232 |

(List continued on next page.)

FOREIGN PATENT DOCUMENTS

| | | |
|---|---|---|
| DE | 2458784 | 6/1976 |
| DE | 2719875 | 11/1978 |
| GB | 1566502 | 4/1980 |

OTHER PUBLICATIONS

International Search Report dated Dec. 03, 2002 (PCT/US02/22736).

Primary Examiner—Thomas M. Lithgow
(74) Attorney, Agent, or Firm—Patterson, Thuente, Skaar & Christensen, P.A.; John F. Thuente

(57) ABSTRACT

A filter assembly includes a water filter assembly having a filter element sealingly disposed in a cartridge, and having an inlet and an outlet, the water filter assembly being substantially dripless when charged with water and disposed substantially horizontally. A manifold assembly is fluidly couplable at an inlet to a source of water to be filtered and having a filtered water outlet and having mating members for removably mating to the water filter assembly and having a mounting means attached to said manifold providing rotational travel to the water filter assembly for installation, removal and replacement of the water filter assembly. A cartridge and a water distribution manifold assembly are further included.

12 Claims, 8 Drawing Sheets

U.S. PATENT DOCUMENTS

| | | | |
|---|---|---|---|
| 5,015,316 A | 5/1991 | Ostreicher et al. | 156/69 |
| 5,022,986 A | 6/1991 | Lang | |
| 5,028,327 A | 7/1991 | Ostreicher et al. | 210/450 |
| D320,256 S | 9/1991 | Giordano et al. | D23/209 |
| D321,394 S | 11/1991 | Petrucci et al. | D23/209 |
| D322,836 S | 12/1991 | Petrucci et al. | D23/209 |
| 5,069,786 A | 12/1991 | Pulek | 210/232 |
| 5,116,502 A * | 5/1992 | Ferguson | |
| 5,126,043 A | 6/1992 | Giordano et al. | 210/249 |
| 5,126,044 A | 6/1992 | Magnusson et al. | 210/282 |
| 5,151,180 A | 9/1992 | Giordano et al. | 210/264 |
| 5,167,814 A | 12/1992 | Pulek | 210/232 |
| 5,269,919 A | 12/1993 | Von Medlin | 210/256 |
| 5,277,805 A * | 1/1994 | Ferguson | |
| 5,304,300 A | 4/1994 | Parsons | |
| 5,328,609 A | 7/1994 | Magnusson et al. | 210/314 |
| 5,336,406 A | 8/1994 | Stanford et al. | 210/235 |
| 5,354,464 A | 10/1994 | Slovak et al. | 210/240 |
| 5,399,264 A | 3/1995 | Pulek et al. | 210/450 |
| 5,482,624 A | 1/1996 | Swiatek et al. | 210/238 |
| 5,486,288 A | 1/1996 | Stanford et al. | 210/235 |
| 5,548,893 A | 8/1996 | Koelfgen | 29/888.011 |
| 5,562,824 A | 10/1996 | Magnuson | 210/266 |
| 5,591,332 A | 1/1997 | Reid et al. | 210/235 |
| 5,607,584 A | 3/1997 | Swiatek et al. | 210/238 |
| 5,653,878 A * | 8/1997 | Reid | |
| 5,705,067 A * | 1/1998 | Sumi et al. | |
| 5,753,107 A | 5/1998 | Magnusson et al. | 210/109 |
| 5,779,903 A | 7/1998 | Smith et al. | 210/440 |
| 5,826,854 A | 10/1998 | Janvrin et al. | 251/149.9 |
| 5,891,333 A * | 4/1999 | Ferguson | |
| 5,914,037 A | 6/1999 | Yen | 210/234 |
| 5,919,360 A | 6/1999 | Contaxis, III et al. | 210/198.1 |
| 5,919,362 A | 7/1999 | Barnes et al. | 210/232 |
| D413,961 S | 9/1999 | Bassett | D23/209 |
| 5,965,019 A | 10/1999 | Olsen et al. | 210/331 |
| 6,139,741 A | 10/2000 | McGibbon | 210/323.1 |
| 6,325,929 B1 | 12/2001 | Bassett | 210/238 |

* cited by examiner

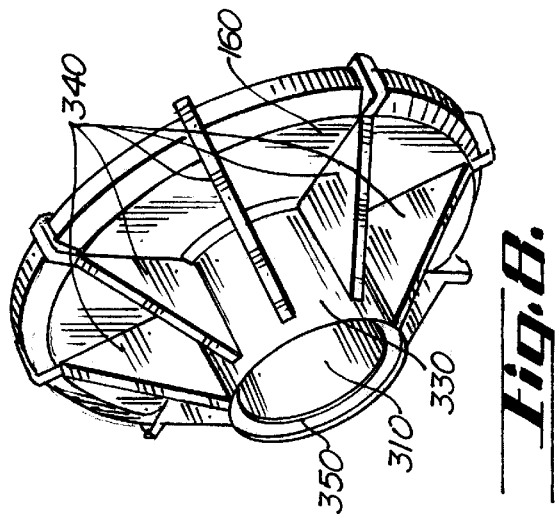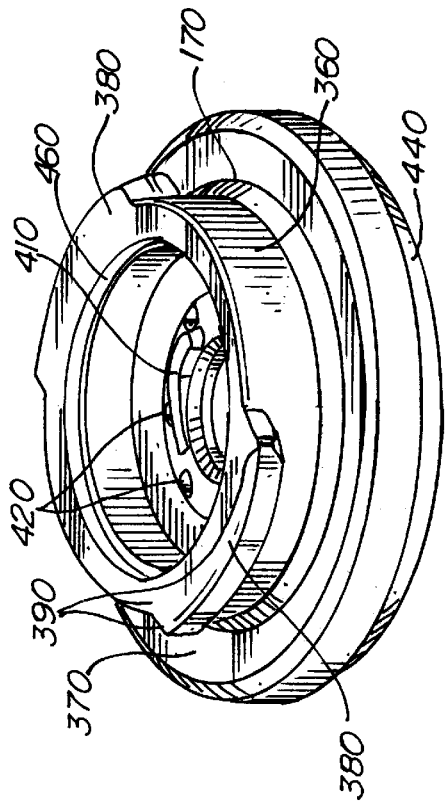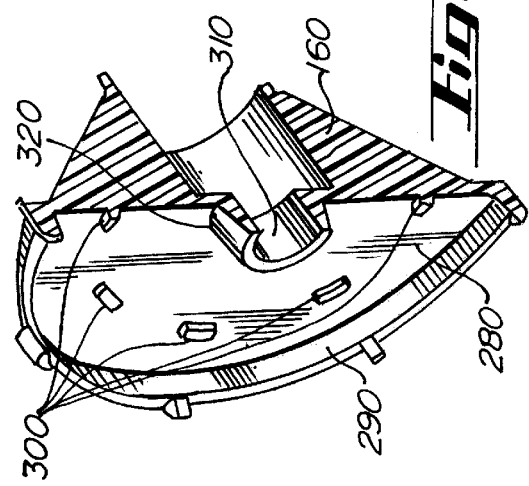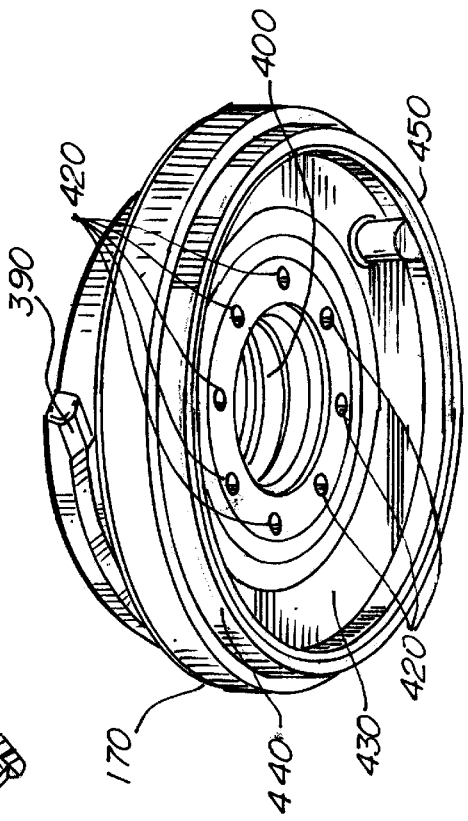

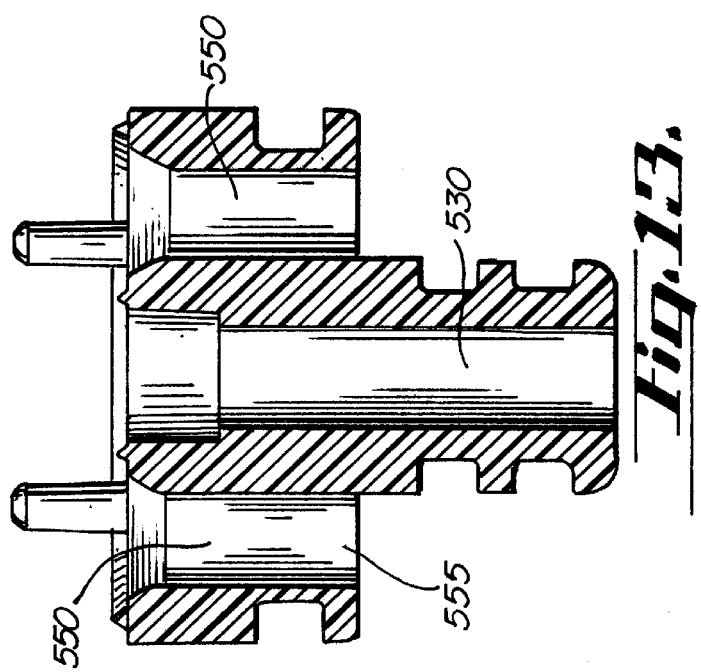
Fig.13.
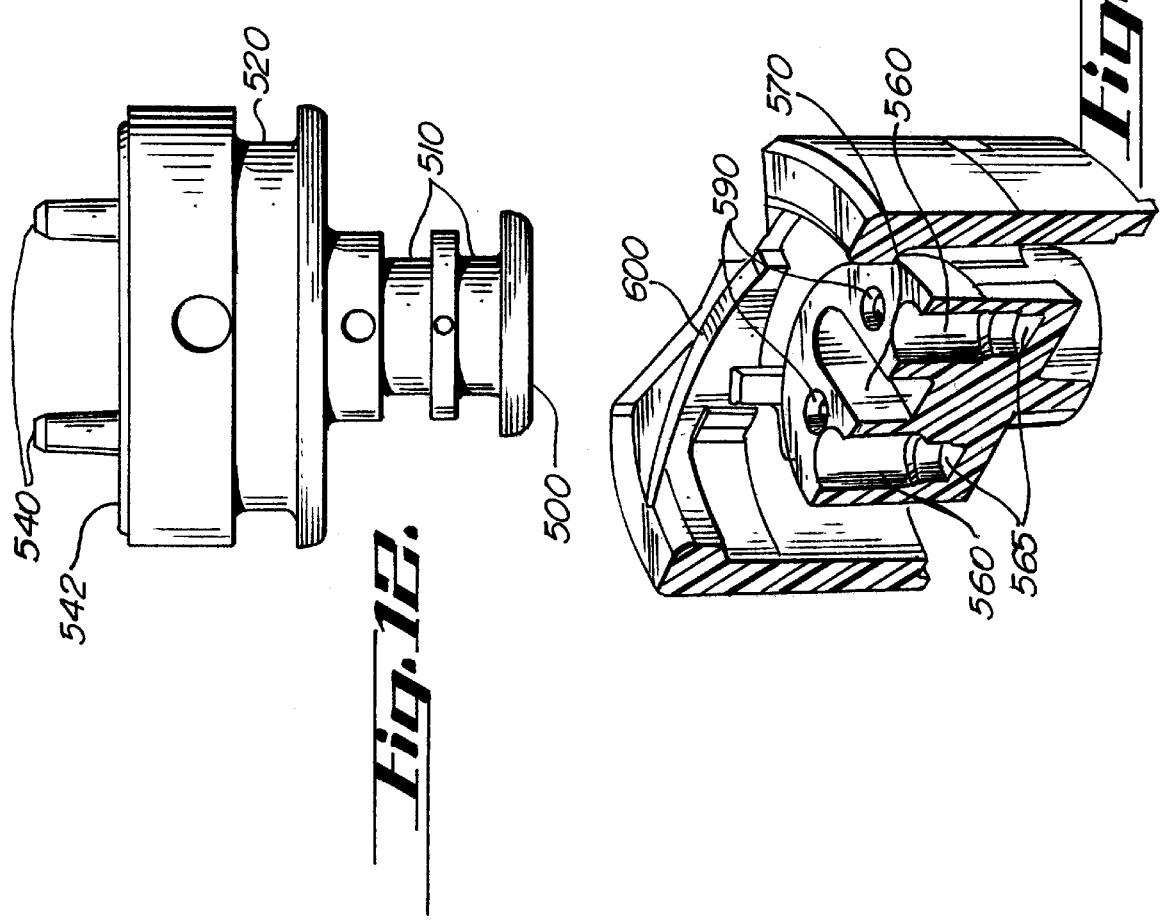
Fig.12.
Fig.14.

LOW SPILLAGE REPLACEABLE WATER FILTER ASSEMBLY

TECHNICAL FIELD

The present invention relates to a replaceable water filter assembly for the filtering of drinking water. Specifically, the invention relates to a drinking water filter assembly in which a used filter can be replaced with a new filter with very low spillage regardless of the mounting orientation of the water filter assembly.

BACKGROUND OF THE INVENTION

Water filter assemblies for industrial, commercial and consumer use are widely known throughout the industry. It is well know that when water filter assemblies are used by consumers or in consumer goods, they must be limited in size to accommodate available space limitations. As a filter's volume and/or surface area are the key components of filter capacity, these smaller consumer filters have less filtering capacity than their larger commercial and industrial brethren. It is this reduced filtering capacity requiring more frequent replacement that makes it a necessity for consumer water filter assemblies to be designed for quick and convenient filter element replacement.

Unfortunately, the combination of quick and easy replacement along with the consumer's demand for a low price has lead to designs in which water is easily spilled during filter replacement. Due to the consumer water filter's small size, it can be mounted in a multiplicity of locations and orientations. These locations and orientations are often not easily accessible for the consumer which makes clean-up of any spilled water even more difficult. What is needed is a water filter assembly design in which the assembly can be mounted in a multitude of locations and orientations with no detriment to the speed and ease of filter element replacement while also incorporating a low spillage design.

SUMMARY OF THE INVENTION

The water filter assembly of the present invention meets the aforementioned requirements of the industry. The water filter assembly design includes a virtually leak-proof replaceable filter assembly and a molded water manifold assembly having inlet flow valves and a drop down design providing quick and easy access when replacing a filter assembly. In combination, these elements provide quick and easy maintenance along with the convenience of low spillage.

The replacement filter assembly consists of a cylindrical filter element located within a molded, cylindrical housing. The filter assembly is designed to be inserted and removed with a minimum of rotational force applied by the consumer. Replacement of a filter assembly requires no tools or manipulation of valves or plumbing prior to maintenance. Used filter assemblies can be immediately discarded with no disassembly required.

For purposes of discussion, the specification will reference a Granular Activated Carbon (GAC) filter. One versed in the industry will understand that a variety of other commercially available filters could be used in place of the GAC filter. These filters could include but are not limited to depth, surface, media, ionic and membrane type filters. In the current invention, unfiltered water flows from the outside of the filter into the center. Contaminants including organic compounds, particles and chlorine are removed and filtered water is present in the interior cavity of the filter. Attached to the incoming end of the filter is a glue dam which prevents incoming unfiltered water from coming in contact with filtered water inside the filter cavity. The glue dam also serves to distribute the incoming water to the outside surface of the filter element so that the entire cross section of the filter is used in the filtering process.

In an embodiment, the glue dam has a neck that is disposable in a spaced apart relationship with an aperture defined in a top of the filter cartridge. By being spaced apart, the filter cartridge top is free to be rotated without imparting rotational motion to the glue dam. In this manner, the filter top may be spin or sonic welded to the cartridge housing body without disturbing the glue darn and the filter element to which the glue dam is adhered. Spin welding the filter top to the filter cartridge housing is a unique feature of the present invention.

The GAC filter is contained in a molded, fluted filter housing. The housing is tapered on the molded end such that the housing diameter is slightly less than the filter element. An adhesive is applied to the housing molded end prior to inserting the GAC filter. The combination of the adhesive and the compression required to fully insert the GAC filter prevents unfiltered water from bypassing the filter and entering the filtered water cavity inside the filter element. The filter housing is closed and sealed via an end cap. The end cap is fixed to the housing via gluing, welding or other appropriate means suitable to the materials. The end cap serves additional purposes including a means for interfacing with the water distribution manifold and also providing force against the glue dam to hold and seal the filter.

At time of installation or removal, the filter assembly interfaces directly with the molded water manifold. The water manifold interfaces with the filter assembly in three distinct ways. First, the filter assembly is physically held in place via a ramp/tab interlock system. Secondly, the water manifold assembly has an insertion plug with o-rings that passes through the filter cap and into a bore in the filter dam which is in fluid contact with the filtered water cavity of the filter element. Finally, the water manifold assembly contains at least one and preferably two mechanically driven shut-off valves for incoming unfiltered water which are forced open when the filter assembly is rotated into the attached position.

The water manifold incorporates molded flow channels to route incoming unfiltered water to the filter assembly while allowing filtered water to be removed from the filter assembly and sent to its point of use. As part of the spill proof design of the entire assembly, the water manifold incorporates two mechanically driven valves located in the contiguous unfiltered water supply channels. Unless the filter assembly is mounted to the water manifold, these valves serve to prohibit the flow of unfiltered water. Thus, during a filter change water is prevented from flowing out of the supply channels without any input from the consumer other than the removal of the filter assembly.

In one embodiment, the mounting bracket serves as a base by which the entire assembly is positioned into place by the user. In the operating disposition, the filter cartridge is held in a substantially horizontal orientation. The bracket interfaces with the water manifold via a snap leg mechanism which provides a fast and permanent coupling of these components. The mounting bracket includes a set of swing arms and an angled body. These features allow the bracket including the water manifold and filter assembly to be rotated downward a fixed amount to provide easy access and maneuvering space during a filter assembly change-out.

In another embodiment, the water manifold assembly has two axial protrusions by which the entire water filter assembly is mounted and held in position. The axial protrusions can be solid rod type protrusions for insertion into a catch mechanism. The axial protrusions can also have bores to accept protrusions for holding the water filter assembly in position. Furthermore, the axial protrusions can be used for mounting a fixture cover over the entire water filter assembly. This allows the fixture cover to be rotated out of position for maintenance and installation purposes and back into position when the water filter assembly is ready for service.

The present invention is a filter assembly that includes a water filter assembly having a filter element sealingly disposed in a cartridge, and having an inlet and an outlet, the water filter assembly being substantially dripless when charged with water and disposed substantially horizontally. A manifold assembly is fluidly couplable at an inlet to a source of water to be filtered and having a filtered water outlet and having mating members for removably mating to the water filter assembly and having a mounting means attached to said manifold providing rotational travel to the water filter assembly for installation, removal and replacement of the water filter assembly.

A cartridge and a water distribution manifold assembly are further included. The present invention is further a cartridge and a water distribution manifold assembly.

BRIEF DESCRIPTION OF THE DRAWINGS

FIG. 7 is a three dimensional cut-away view of the bottom of the filter dam;

FIG. 8 is a three dimensional top view of the filter dam;

FIG. 9 is a three dimensional top view of the filter end cap;

FIG. 10 is a three dimensional bottom view of the filter end cap;

FIG. 12 is an elevational cross-section view of the water filter interface;

FIG. 13 is an elevational cut-away cross-sectional view of the filter interface;

FIG. 14 is a three dimensional cut-away view of the flow manifold;

DETAILED DESCRIPTION OF THE DRAWINGS

Figure 1:
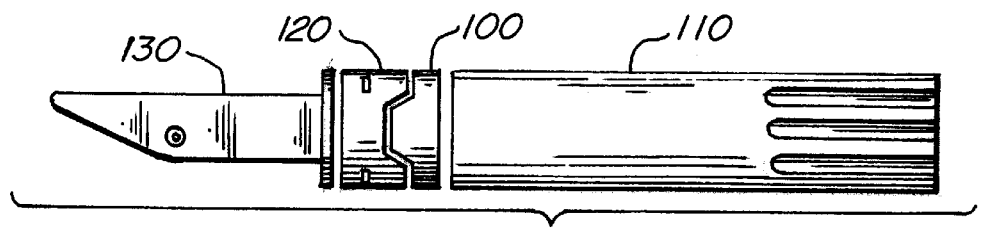
FIG. 1 is a perspective view of the low spillage water filter assembly.
Figure 2:
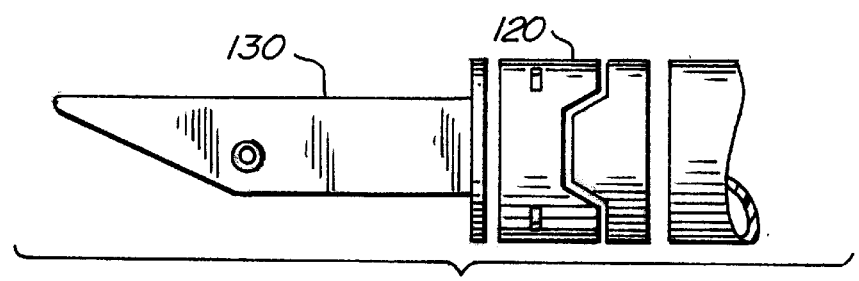
FIG. 2 is an exploded perspective view of the low spillage water filter assembly.

The low spillage replaceable water filter assembly is shown generally at 100 in FIG. 1. The water filter assembly 100 incorporates three major components (See FIG. 2): filter assembly 110, water distribution manifold 120 and mounting bracket 130.

Figure 3:
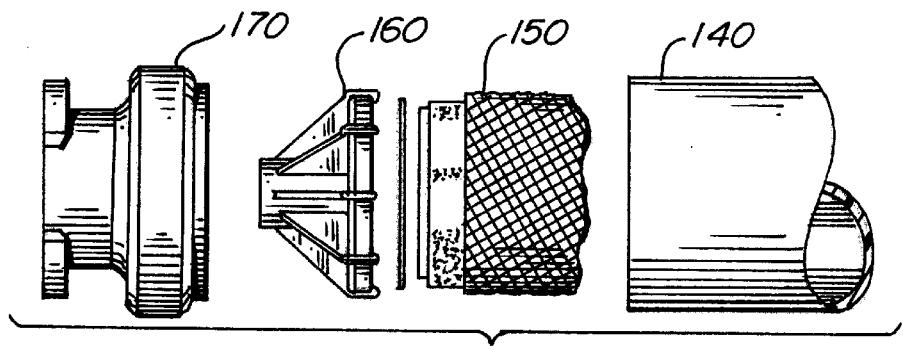
FIG. 3 is an exploded perspective view of the water filter assembly.

The filter assembly 110 includes four distinct elements (See FIG. 3): filter housing 140, GAC filter element 150, filter dam 160 and end cap 170.

Figure 4:
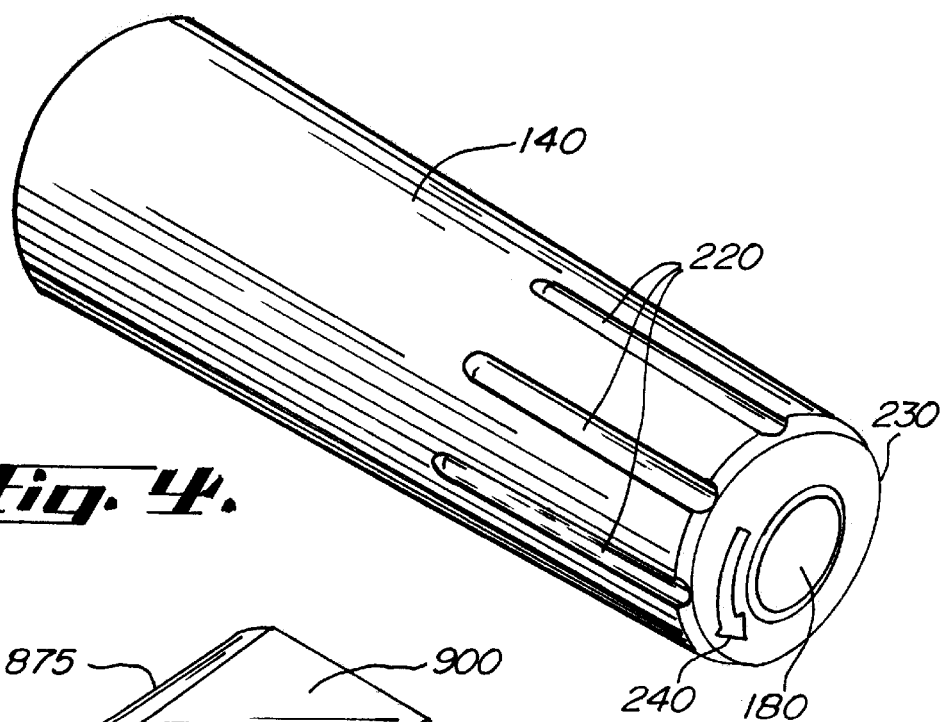
FIG. 4 is a three dimensional perspective end view of the filter housing.
Figure 5:
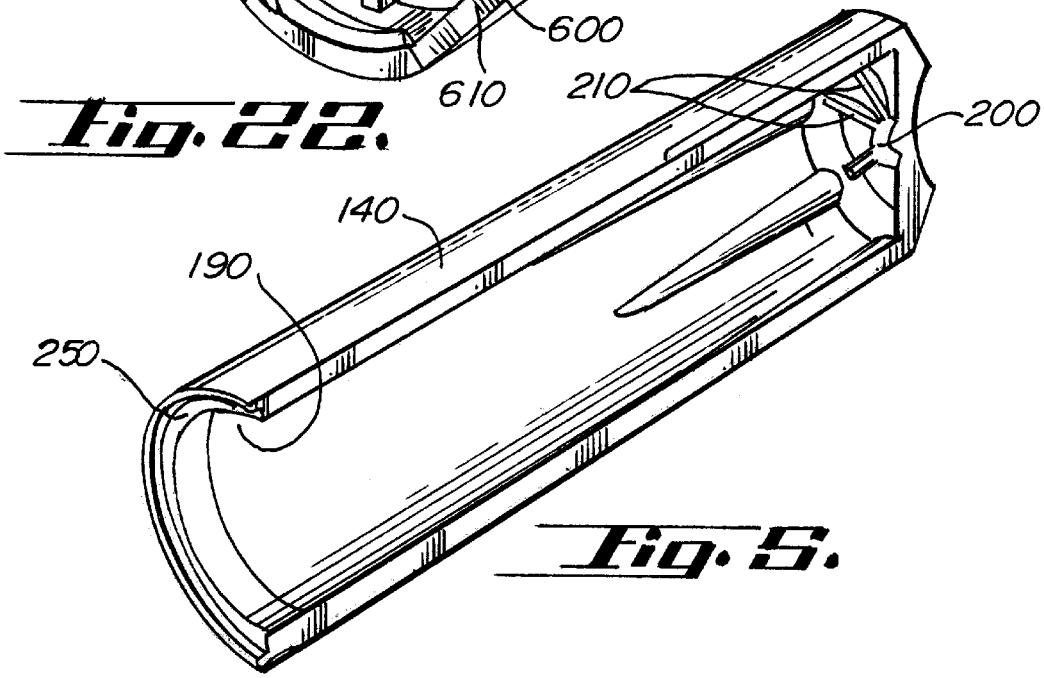
FIG. 5 is a three dimensional cut-away view of the open end of the filter housing.

The filter housing 140 (See FIGS. 4 and 5) is a molded, tapered cylindrical housing made of suitable materials. The filter housing 140 has one end 180 which is molded shut and the other end 190 being open. The diameter of the shut end 180 may be less than the diameter of the open end 190. A raised, molded, conical protrusion 200 extends from the center of the shut end 180 toward the open end 190. Surrounding the raised, conical protrusion 200 is a lattice of support ribs 210 extending to the perimeter of the filter housing 140. Extending from the closed end 180 toward the open end 190 is a network of hemispherical grooves 220 around the outside perimeter of the filter housing 140. Molded into the closed end 180 on the outside of the filter housing 140 are instructions 230 and an arrow 240. Located in the inner perimeter of the open end 190 is a recessed lip 250.

Figure 6:
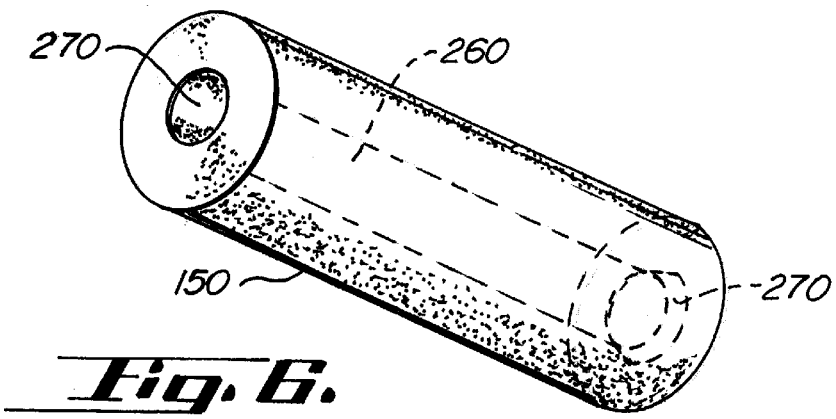
FIG. 6 is a three dimensional perspective view of the filter element.

The GAC filter element 150 (See FIG. 6) is a cylindrical filter with a hollow cavity 260 running throughout the length of the filter. The GAC filter element 150 is open on both ends 270.

The filter dam 160 (See FIGS. 7 and 8) has a mating surface 280 which is recessed inside the perimeter of the filter dam lip 290. The mating surface 280 is flat with the exception of small ridges 300 protruding up from the mating surface 280. The center of the filter dam 160 contains through bore 310. Where the through bore 310 intersects the mating surface 280 is a tapered protrusion 320 extending out from the mating surface 280. On the opposite side of the mating surface 280, a relatively large diameter neck protrusion 330 extends from the intersection of the surface 280 and the through bore 310. The diameter of the large diameter protrusion 330 is significantly larger than the diameter of the tapered protrusion 320. Similarly, the bore 310 has a significantly greater diameter within the neck protrusion 330 as compared to the diameter of the bore 310 in the protrusion 320. Surrounding the large diameter neck protrusion 330 is a network of crush ribs 340. The large diameter protrusion end 350 is tapered on the inside perimeter proximate upper margin of the neck protrusion 330.

The end cap 170 (See FIGS. 9 and 10) has a molded cylinder 360 protruding up from the filter cap surface 370. Located on the outside perimeter of the protruding cylinder 360 are two generally rectangular tabs 380 located 180° from one another. These rectangular tabs 380 have angled faces 390 on two of the diagonally opposing corners. The end cap 170 contains a centrally located through bore 400. The inside diameter of the bore 400 is somewhat greater than the neck protrusion 330.

On the filter cap surface 370, located on the perimeter of the through bore 400 are two small ramps 410 located 180° from one another. Located just beyond the small ramps 410 are a series of evenly spaced small diameter bores 420. Preferably, bores 420 have diameters between 0.030" and 0.125" and are more preferably 0.050". On the filter interface side 430 lies a recessed ridge 440. Just inside the recessed ridge 440 lies a weld energy director 450. The inside end perimeter 460 of the protruding cylinder 360 is tapered.

Figure 11:
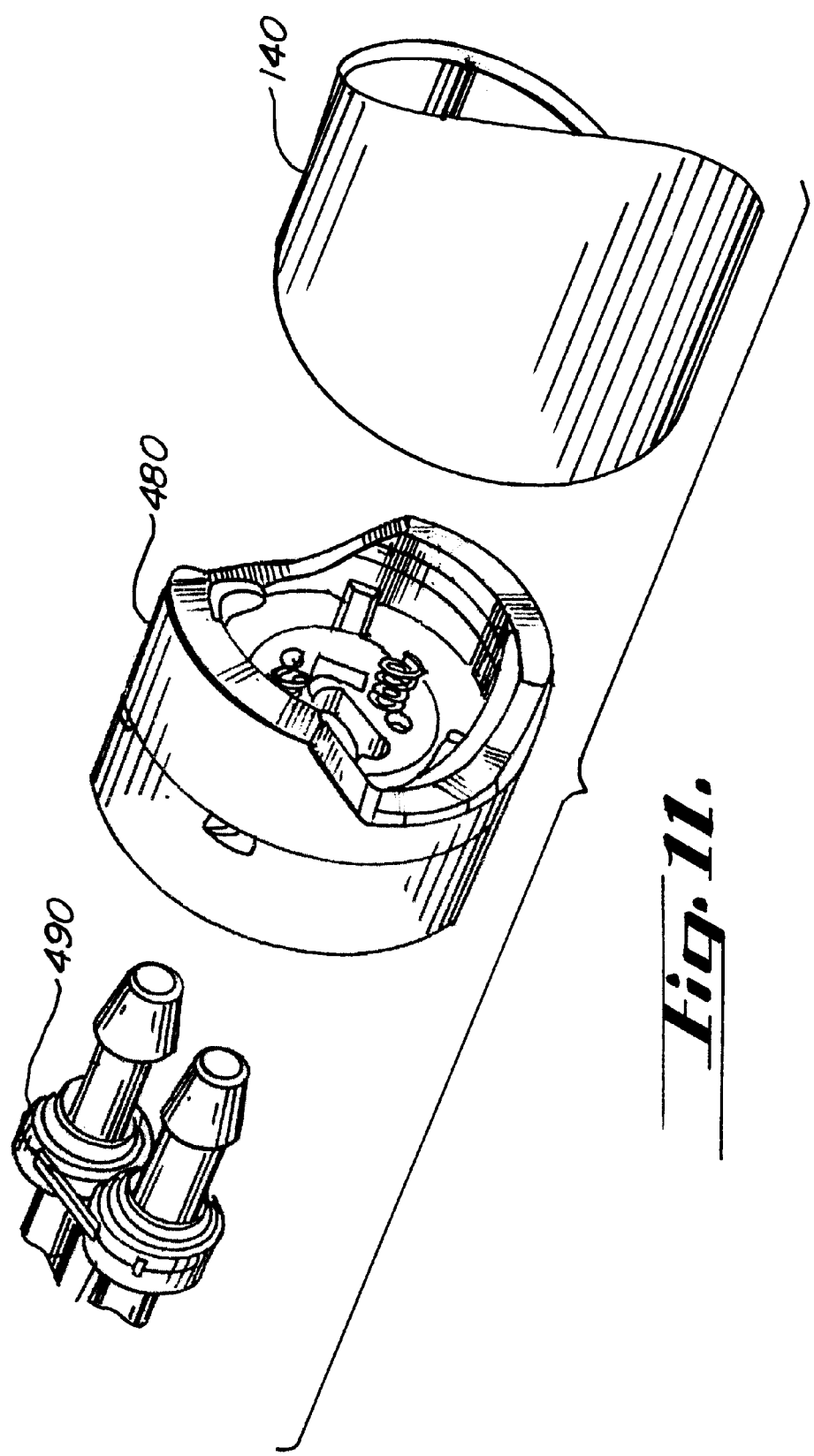
FIG. 11 is an exploded perspective view of the water distribution manifold.
Figure 16:
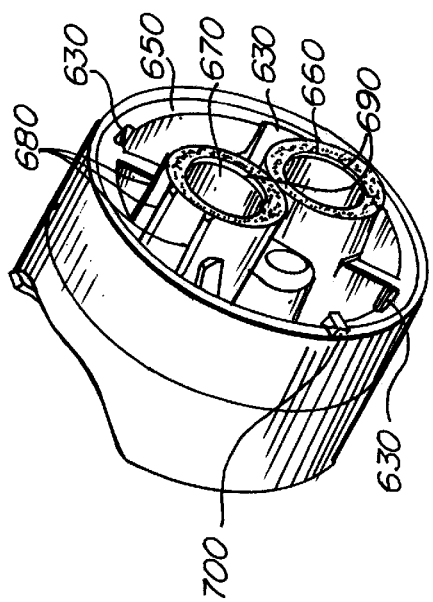
FIG. 16 is a three dimensional end view of the flow manifold.

The water distribution manifold 120 is an assembly consisting of three individual elements (See FIG. 11): water filter interface 470, flow manifold 480 and tubing retainer 490.

Figure 21:
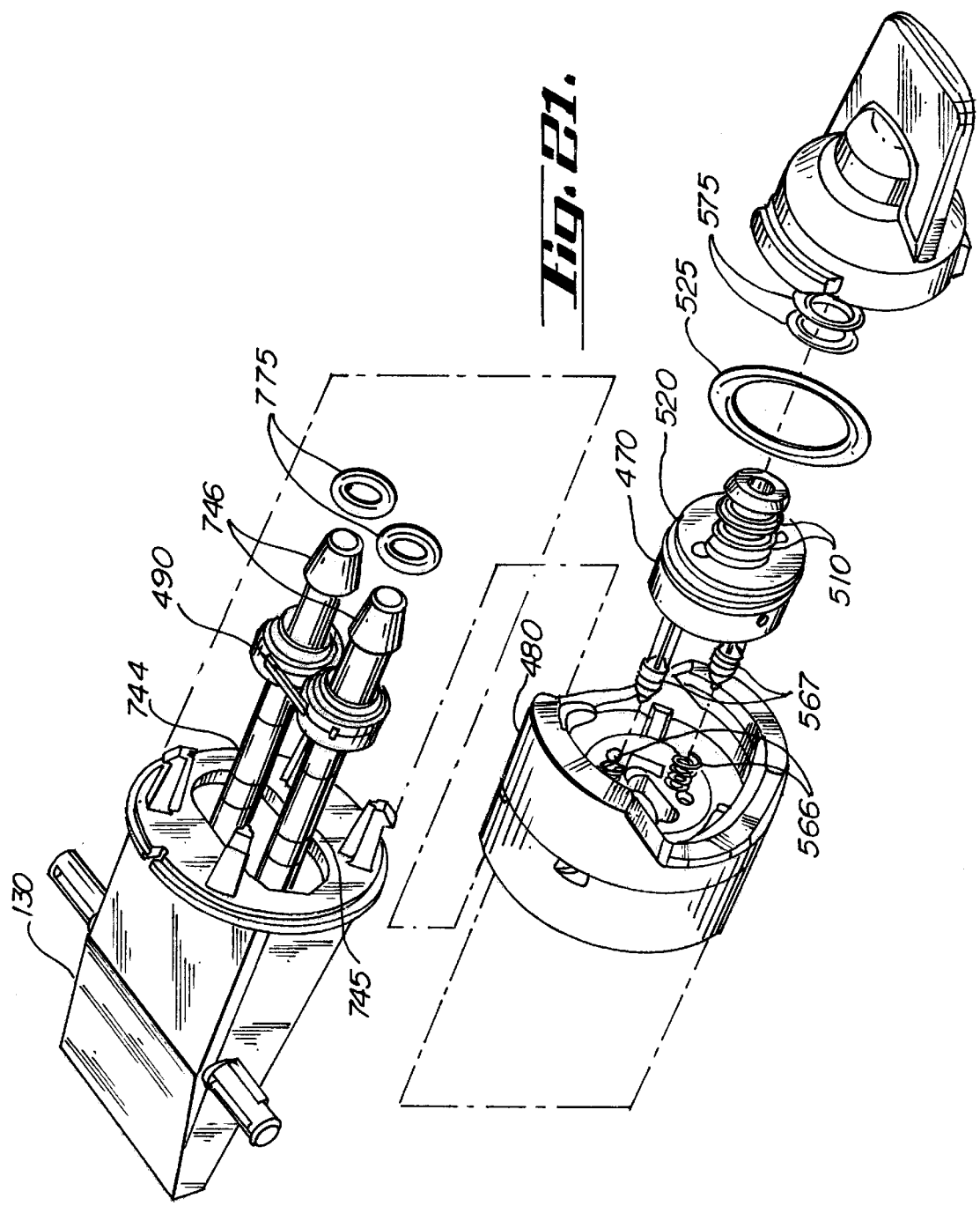
FIG. 21 is a three dimensional assembly drawing of the low spillage water filter assembly.

The water filter interface 470 (See FIGS. 12, 13 and 21) is preferably a molded component and is preferably formed of the same material as the filter housing 140. One end of the water filter interface 470 has a molded insertion plug 500. The outside diameter of the plug 500 is preferably slightly less than the larger inside diameter of bore 310 in the end cap 160. Located on the insertion plug 500, are dual concentric seal grooves 510 which accommodate o-rings 515. A third seal groove 520 of larger diameter which accommodates seal 525 is located at the base of the insertion plug 500.

Through the center of the insertion plug is a bore 530 which extends all the way through the water filter interface 470. On the end opposite the insertion plug 500, two cylindrical mounting lugs 540 extend from the surface 542. Outside the perimeter of the bore 530 are two bores 550 which run parallel to the insertion plug bore 530 and are located 180° opposed from one another.

The flow manifold 480 is preferably a molded piece (See FIGS. 14, 15, 16 and 21) and is preferably made of the same material as the filter housing 140 and water filter interface 470. Molded in the flow manifold 480 are separate conduits for incoming unfiltered water 560 and outgoing filtered water 570. On the filter side 580 of the manifold 480 are two hexagonal bores 590. The flow manifold 480 also has a pair of angular tracks 600 located 180° opposed from one another. At the beginning of the angular tracks 600 are two hemispherical openings 610 in the flow manifold 480. The bracket side 620 of the flow manifold 480 has 4 evenly spaced guide ramps 630 which lead to four notches 640 in the outside of the flow manifold 480. Inside the perimeter of the flow manifold 480 on the bracket side 620 is a recessed lip 650. The bracket side 620 of the flow manifold 480 has two adjacent circular bores, one bore 660 in contact with the molded unfiltered water channels 560 and the other bore 670 in contact with the filtered water channel 570.

Mounted in the unfiltered water channels 560 are the spring valve assemblies 565. The spring valve assembly consists of a spring 566 and a fluted valve body 567. On the outside of the filtered water bore 670 are three hemispherical ridges 680. At the ends of the unfiltered water bore 660 and the filtered water bore 670, there are o-ring grooves 690. On the perimeter of the bracket side 620 is an extended tab 700.

Figure 18:
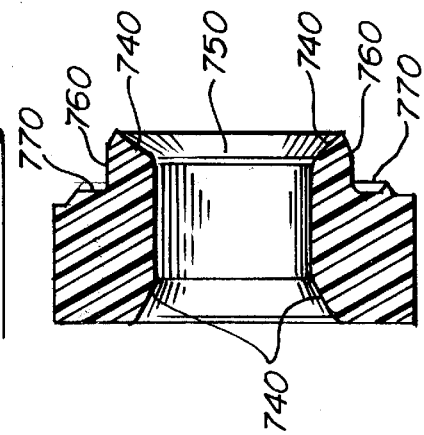
FIG. 18 is an elevational cross-section view of the tubing retainer.
Figure 15:
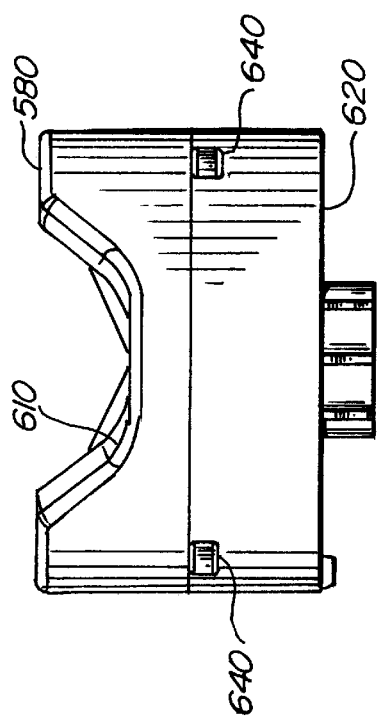
FIG. 15 is an elevational cross-section view of the flow manifold.
Figure 17:
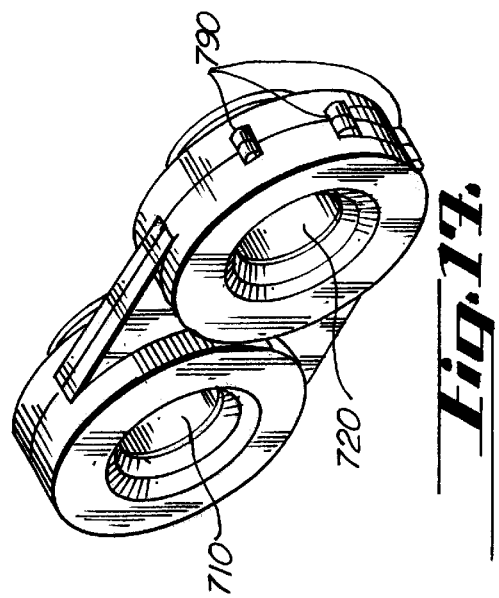
FIG. 17 is a three dimensional end view of the tubing retainer.

The tubing retainer 490 (See FIGS. 17, 18 and 21) has two adjacent bores, an unfiltered water bore 710 and a filtered water bore 720. On the outside of the filtered water bore 720 are 3 hemispherical ridges 730. On both sides of the bores 710 and 720, the openings are tapered 740. On the manifold side 750 of the tubing retainer 490, there is an extension 760 of the bores 710 and 720 with an o-ring groove 770 accommodating o-rings 775 at the base of each extension 760. Extending through the unfiltered water bore 710 is the unfiltered water supply tubing 744. Extending through the filtered water bore 720 is the filtered water return tubing 745. Both the unfiltered water supply tubing 744 and filtered water return tubing 745 have a barbed and tapered end 746.

Figure 19:
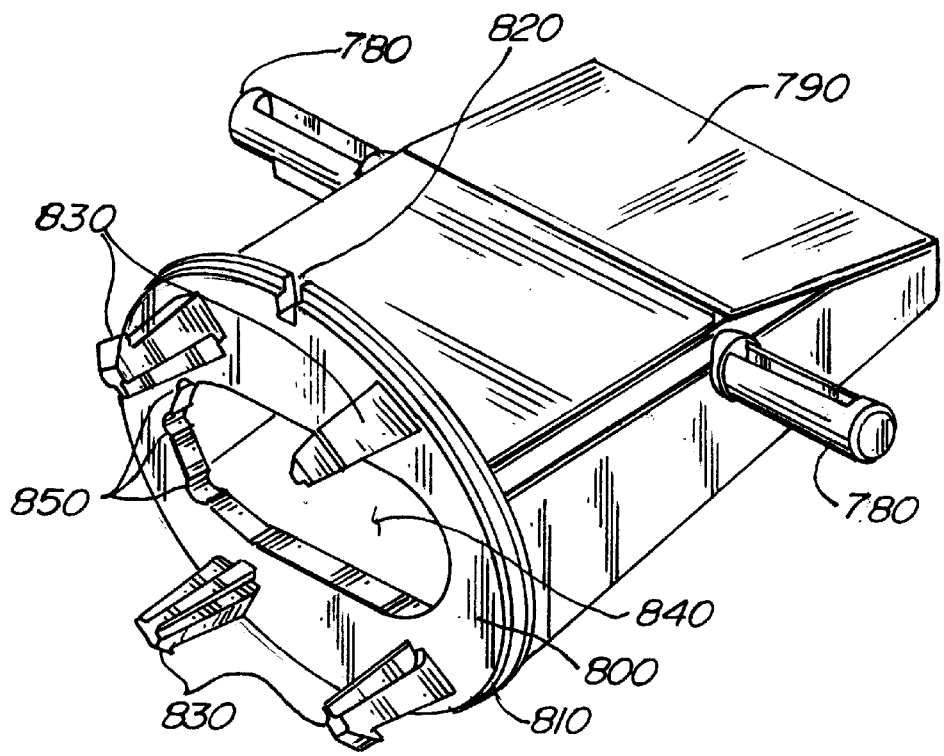
FIG. 19 is a three dimensional end view of the mounting bracket.
Figure 20:
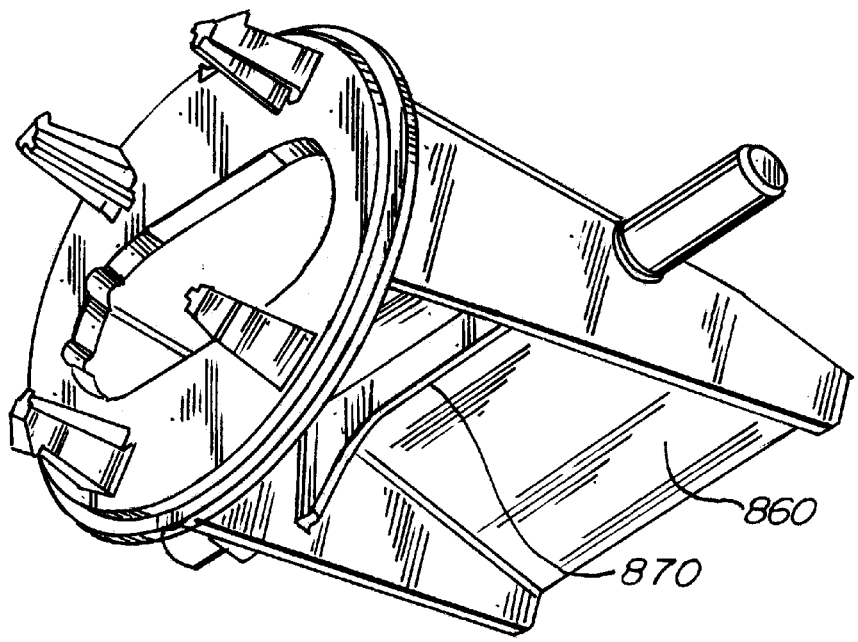
FIG. 20 is a three dimensional bottom view of the mounting bracket.

The mounting bracket 130 (See FIGS. 19 and 20) is a molded component of the same material as the filter housing 140 and water distribution manifold 120. The mounting bracket 130 has two pivot arms 780 opposite one another. The mounting bracket 130 has a pivot ramp 790. The mounting bracket 130 has a circular mounting face 800. The outside edge of the mounting face 800 is grooved 810. The mounting face 800 has a notch cutout 820 in the outside edge. Located on the mounting face 800 are four snap posts 830. The mounting face 800 has opening 840. One side of the opening 840 has three hemispherical notches 850. On the bottom side 860 of the mounting bracket 130, there is a support rib 870 running between the pivot arms 780.

Figure 22:
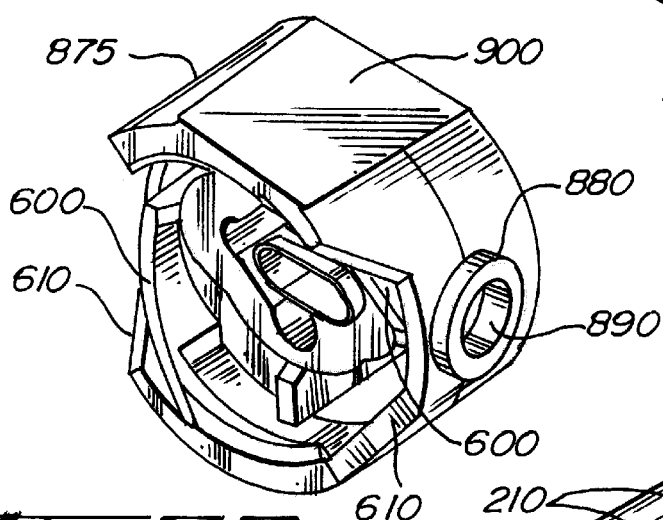
FIG. 22 is a three dimensional end view of another embodiment of the flow manifold.

In another embodiment (See FIG. 22), the flow manifold 875 has two cylindrical protrusions 880 located 180° opposed from one another. The cylindrical protrusions 880 have hollow bores 890 which extend the length of the cylindrical protrusions 880.

In one embodiment, the water filter assembly 110, water distribution manifold 120 and mounting bracket 130 are attached to make the low spillage filter assembly 100.

The first step in assembling the water filter assembly 110 is to attach the filter dam 160 to one end of the filter element 150. The tapered protrusion 320 of the filter dam 160 is inserted into the filter cavity 260. The mating surface 280 is bound to the filter element 150 through hot melt gluing or other suitable attachment method based on the materials. The ridges 300 on the mating surface 280 provide a fixed stop to insure proper assembly height and to eliminate the adhesive layer from being compressed into a thin film.

Following attachment of the filter dam 160, an adhesive is dispensed into the filter housing 140 and the filter element 150 is inserted into the filter housing 140. The raised conical protrusion 200 of the filter housing 140 projects into the filter cavity 260. The raised conical protrusion 200 centers the filter element 150 in the filter housing 140 and prevents the adhesive from entering the filter cavity 260. The filter interface side 430 of the filter end cap 170 is placed over the top of the filter dam 160 with the large diameter protrusion 330 extending into the through bore 400. The recessed ridge 440 of the filter end cap 170 interfaces with the recessed lip 250 of the filter housing 140. The filter end cap 170 is permanently fixed to the filter housing 140 by attaching the recessed lip 250 and the recessed ridge 440 via a sealing mechanism appropriate to the materials. These sealing mechanisms may include either spin welding or sonic welding techniques. During the sealing process, the material fuses to form a water-tight seal between the housing 140 and the filter end cap 170.

The next step in assembling the low spillage filter assembly 100 is to assemble the water distribution manifold 120. The two spring valves 565 are inserted into the unfiltered water channels 560 located on the flow manifold 480. The cylindrical mounting lugs 540 on the water filter interface 470 are aligned with and inserted into the hexagonal bores 590 on the flow manifold 480. The connection between the water filter interface 470 and the flow manifold 480 is made permanent with attachment methods appropriate to the materials, such as sonic welding. The barbed, tapered ends 746 of the unfiltered water supply tubing 744 and the filtered water return tubing 745 are inserted through the unfiltered water bore 710 and filtered water bore 720 of the tubing retainer 490. The unfiltered water supply tubing 744 and the filtered water return tubing 745 are inserted through o-rings 775. O-rings 775 reside in the unfiltered water bore 660 and the filtered water bore 670 and form a watertight seal between the tubing retainer 490 and the flow manifold 480. The hemispherical ridges 730 on the tubing retainer 490 is aligned with the hemispherical ridges 680 on the flow manifold 480. Finally, tubing retainer 490 is permanently attached to the flow manifold 480 via appropriate binding methods for the material. Sonic welding is a suitable means of attaching certain materials.

The final step in assembling the low spillage filter assembly 100 is to attach the mounting bracket 130 and the water distribution manifold 120. The unfiltered water supply tubing 744 and the filtered water return tubing 745 are inserted through the mounting face opening 840. The hemispherical ridges 730 on the tubing retainer 490 are aligned with the hemispherical notches 850 in the mounting face opening 840. The snap posts 830 are aligned with the guide ramps 630 on the water distribution manifold 120. Insertion force is applied to the snap posts 830 until they engage with the manifold notches 640 which create a permanent connection between the mounting bracket 130 and the water distribution manifold 120. At this point, extended tab 700 should be aligned with and residing in notch cut-out 820.

In another embodiment, the flow manifold 875 is attached to the filter assembly 110 by the means previously described. In place of the mounting bracket 130, the water filter assembly 100 is mounted into position through the use of cylindrical protrusions 880. The cylindrical protrusions 880 can be inserted into a holding mechanism for positioning and mounting the water filter assembly 100. Furthermore, the hollow bores 890 can be used as receivers in conjunction with an insertion mechanism to mount and hold the water filter assembly 100. The cylindrical protrusions 880 can also be used to provide a mounting mechanism for a cover assembly for the entire water filter assembly 100.

In operation, unfiltered water is supplied through the unfiltered water supply tubing 744 attached to the unfiltered water bore 710 on the tubing retainer 490. The unfiltered water flows from the unfiltered water bore 710, through the unfiltered water bore 660 on the flow manifold 480 and into the unfiltered water channel 560. If the water filter assembly 110 is attached to the water distribution manifold 120, the spring valves 565 in the unfiltered water channel 560 are compressed and water is allowed to flow through the small diameter bores 550 on the water filter interface 470. The water emerges from the small diameter bores 550 and enters the water filter assembly 110 through the small diameter bores 420 located on the filter end cap 170.

Inside the water filter assembly 110, the crush ribs 340 keep the filter element 150 in compression. This compression forces the filter open end 270 to seal against the raised conical protrusion 200 of the filter housing 140. The slip fit design between the filter dam 160 and the filter end cap 170 allows the filter housing 140 to elongate under pressure without placing tension on the filter element 150 which could result in the failure of the filter element 150. In addition to providing compression, the crush ribs 340 also protect the water filter assembly 110 from breakage in the event that the water filter assembly is dropped.

Once the unfiltered water is supplied to the water filter assembly 110, it is dispersed by the filter dam 160 to the outside of the filter element 150. The unfiltered water travels through the filter media and emerges into the filter cavity 260 as filtered water. The filtered water flow out of the filter cavity 260, through the through bore 310 of the filter dam and into the through bore 530 in the insertion plug 500. The filtered water flows out of the through bore 530 and into the filtered water channel 570 of the flow manifold 480. The filtered water flows though the filtered water bore 670, through the filtered water bore 720 and to point of use through the filtered water return tubing 745 attached to the tubing retainer 490.

At time of first use or based upon a period of continuous usage, the water filter assembly 110 will require installation or routine replacement. In one embodiment, the low spillage replaceable water filter assembly 100 is rotated into a more accessible position by rotation around the pivot arms 780 located on the mounting bracket 130. The pivot ramp 790 rotates until it is in contact with the mounting surface which serves to hold the low spillage replaceable water filter assembly 100 in position.

In another embodiment, the flow manifold 875 has two cylindrical protrusions 880 which are used to provide rotational travel for the low spillage replaceable water filter assembly 100. The cylindrical protrusions 880 can be inserted into a retaining device on the mounting surface or an insertion device on the mounting surface can be inserted into the hollow bores 890 of the cylindrical protrusions 880. The angled surface 900 molded into the flow manifold 875 limits the amount of rotation of the low spillage replaceable water filter assembly 100 by contacting the mounting surface. A cover offering aesthetic and functional qualities can be installed over the low spillage replaceable water filter assembly 100 by fastening it to the cylindrical protrusions 880. The cylindrical protrusions 880 provide rotational travel for the cover depending upon the status of the low spillage replaceable water filter assembly 100.

Regardless of the embodiment, removal of the water filter assembly 110 is accomplished through the consumer gripping the filter housing 140 by hand and rotating it counter-clockwise as indicated by the instructions 230 on the filter housing 140. When the water filter assembly 110 has been removed, water leakage is prevented through the design mechanisms of the present invention. First, the two ramps 410 on the filter end cap 170 disengage from their interface with the spring valves 565 located in the small diameter bores 550 of the water filter interface 470. This prevents unfiltered water from spilling out of the water distribution manifold 120. Second, the small diameter bores 420 on the filter end cap 170 are sized so that the surface tension of the water prevents spillage out of the small diameter bores 420 when the water filter assembly 110 is removed. This in turn creates a vacuum which prevents water from spilling out of the through bore 400 on the filter end cap as well.

At time of first use or following removal of a consumed water filter assembly 110, a new water filter assembly 110 must be attached to the water distribution manifold 120. Depending upon the embodiment, the low spillage replaceable water filter assembly 100 is rotated into an accessible position using either the pivot arms 780 on the mounting bracket 130 or the cylindrical protrusions 880 on the flow manifold 875. The consumer aligns the rectangular tabs 380 on the filter end cap 170 with the hemispherical notches 610 of the flow manifold 480. By applying a clockwise rotation to the water filter assembly 110, the angled corners 390 on the rectangular tabs 380 of the filter end cap 170 will interface with the angular tracks 600 on the flow manifold 480. As the consumer rotates the water filter assembly 110 into position, the insertion plug 500 enters the through bore 310 on the filter dam 160 and the o-rings 515 seal along the inner surface of the through bore 310. At the same time, the o-ring 525 seats in the large diameter o-ring groove 520 and provides a seal against the inside wall of the protruding cylinder 360. Installation of the new water filter assembly 110 is complete when the consumer is no longer able to continue with the clockwise rotation. At this point, spring valves 565 are returned to an open position and unfiltered water can begin to flow. The supply pressure of the unfiltered water overcomes the surface tension of the small diameter bores 420 and water begins to flow through the water filter assembly 110.

It will be obvious to those skilled in the art that other embodiments in addition to the ones described herein are indicated to be within the scope and breadth of the present application. Accordingly, the applicant intends to be limited only by the claims appended hereto.

What is claimed is:

1. A filter cartridge assembly for selective, replaceable mating to a manifold, comprising:
   a cartridge having a filter element sealingly disposed in a cartridge, and having an inlet and an outlet, the inlet being formed of at least one bore, the bore having a certain size such that the cartridge is substantially dripless when charged with water and disposed substantially horizontally.

2. The filter cartridge assembly of claim 1, the cartridge inlet being a plurality of inlet bores each of the bores being selected to have a size wherein a property of water in the cartridge results in the water acting to form a substantially water tight seal in each of the inlet bores when the charged cartridge is disposed in a substantially horizontal disposition.

3. The filter cartridge assembly of claim 2, the cartridge outlet being at least one outlet bore, the substantially water tight seal in each of the inlet bores acting to create a vacuum in the filter cartridge assembly, said vacuum acting to prevent the passage of water from the at least one outlet bore when the cartridge is disposed in the substantially horizontal disposition.

4. The filter cartridge assembly of claim 3 wherein the diameter of each of the inlet bores is between 0.030" and 0.125".

5. The filter cartridge assembly of claim 4 wherein the diameter of each of the inlet bores is preferably substantially 0.050".

6. The filter cartridge assembly of claim 1, the cartridge having a housing sealingly matable at an interface to an end cap, a sea being formable at the interface by the technique of friction welding.

7. The filter cartridge assembly of claim 6, the cartridge having a glue dam, the glue dam being spaced apart from the end cap for being substantially free of the influence of any rotational motion imparted to the end cap to effect a spin weld.

8. The filter cartridge assembly of claim 7, the glue dam being matable to a water distribution manifold in a substantially water tight, readily disengageable engagement.

9. The filter cartridge assembly of claim 1, the cartridge having a glue dam having a plurality of angular supports, a cartridge end cap bearing on the plurality of end supports when the end cap is sealingly engaged with a cartridge housing.

10. The filter cartridge assembly of claim 9, the glue dam having an inlet, the inlet being sealingly disposable in an axial bore defined in the filter element, said sealing disposition substantially preventing the passage of air into the axial bore.

11. The filter cartridge assembly of claim 9, the cartridge glue dam and end cap being disposable in a slip fit, the slip fit substantially isolating the glue dam and filer element from any substantial weld forces imposed on the end cap.

12. The filter cartridge assembly of claim 11, the cartridge end cap bearing on the plurality of end supports when the end cap to hold the filter element in a known compressive engagement while substantially isolating the glue dam and filer element from any substantial weld forces imposed on the end cap.

* * * * *